United States Patent
Skweres et al.

(10) Patent No.: US 10,994,756 B2
(45) Date of Patent: *May 4, 2021

(54) ELECTRONICALLY CONTROLLED BRAKE OVERLAY SYSTEM FOR DISTRIBUTOR VALVE

(71) Applicant: Westinghouse Air Brake Technologies Corporation, Wilmerding, PA (US)

(72) Inventors: Jeffrey B. Skweres, McKeesport, PA (US); Michael S. Plechey, Jeannette, PA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 168 days.

This patent is subject to a terminal disclaimer.

(21) Appl. No.: 16/174,931

(22) Filed: Oct. 30, 2018

(65) Prior Publication Data

US 2019/0144019 A1 May 16, 2019

Related U.S. Application Data

(60) Provisional application No. 62/587,057, filed on Nov. 16, 2017.

(51) Int. Cl.
*B61H 13/34* (2006.01)
*B60T 15/18* (2006.01)
(Continued)

(52) U.S. Cl.
CPC ............ *B61H 13/34* (2013.01); *B60T 13/665* (2013.01); *B60T 15/027* (2013.01); *B60T 15/184* (2013.01);
(Continued)

(58) Field of Classification Search
CPC ....... B61H 13/34; B61H 13/20; B60T 15/184; B60T 15/027; B60T 13/665; B60T 17/043; B60T 17/228
(Continued)

(56) References Cited

U.S. PATENT DOCUMENTS 1,281,801 A * 10/1918 Macloskie ............ B60T 13/665
303/26
3,823,984 A * 7/1974 Parfitt ...................... B60L 7/24
303/3
(Continued)

FOREIGN PATENT DOCUMENTS

AU 1986061599 8/1986
AU 663443 10/1995
(Continued)

*Primary Examiner* — Pamela Rodriguez
(74) *Attorney, Agent, or Firm* — Christopher R. Carroll; The Small Patent Law Group LLC

(57) ABSTRACT

An ECP overlay system for a Russian distributor valve includes a manifold body having a pipe bracket face configured to engage a face of a pipe bracket of a brake system, a valve face configured to engage a face of a main portion of a Russian distributor valve of a brake system, and an electric manifold face. The system further including an electric manifold assembly engaged with the electric manifold face of the manifold body, with the electric manifold assembly having a pneumatic mode where the electric manifold assembly is configured to allow pneumatic-only control of a brake cylinder of brake system and an ECP mode where the electric manifold assembly is configured to allow electronic control of a brake cylinder of a brake system.

19 Claims, 8 Drawing Sheets

(51) Int. Cl.
*B60T 15/02* (2006.01)
*B60T 13/66* (2006.01)
*B60T 17/04* (2006.01)
*B60T 17/22* (2006.01)
*B61H 13/20* (2006.01)

(52) U.S. Cl.
CPC .......... *B60T 17/043* (2013.01); *B60T 17/228* (2013.01); *B61H 13/20* (2013.01)

(58) Field of Classification Search
USPC ..... 303/7, 22.06, 22.7, 3, 15, 20, 28, 35–37, 303/39, 40, 68, 69
See application file for complete search history.

(56) References Cited

U.S. PATENT DOCUMENTS

| | | | |
|---|---|---|---|
| 4,598,953 A | 7/1986 | Wood et al. | |
| 4,652,057 A | 3/1987 | Engle et al. | |
| 5,335,974 A | 8/1994 | Klink | |
| 5,393,129 A | 2/1995 | Troiani et al. | |
| 5,503,467 A | 4/1996 | Gaughan | |
| 5,613,741 A * | 3/1997 | Shank | B60T 13/665 303/36 |
| 5,676,431 A | 10/1997 | McLaughlin et al. | |
| 5,730,504 A | 3/1998 | Gaughan | |
| 5,738,417 A | 4/1998 | Wood et al. | |
| 5,746,484 A | 5/1998 | Gaughan et al. | |
| 5,813,730 A | 9/1998 | Force | |
| 5,881,768 A | 3/1999 | Bezos et al. | |
| 5,967,620 A | 10/1999 | Truglio et al. | |
| 5,984,427 A | 11/1999 | Kettle, Jr. | |
| 5,988,766 A | 11/1999 | McCurdy, Jr. | |
| 6,024,419 A | 2/2000 | Waldrop et al. | |
| 6,035,250 A | 3/2000 | Newton et al. | |
| 6,039,409 A | 3/2000 | Engle | |
| 6,086,163 A | 7/2000 | Klink et al. | |
| 6,120,109 A | 9/2000 | Wood et al. | |
| 6,126,247 A | 10/2000 | Paul et al. | |
| 6,142,442 A | 11/2000 | Carroll | |
| 6,189,980 B1 | 2/2001 | Kull | |
| 6,213,565 B1 | 4/2001 | Hart | |
| 6,217,126 B1 | 4/2001 | Kull | |
| 6,318,812 B1 | 11/2001 | Newton et al. | |
| 6,375,277 B1 | 4/2002 | Carroll | |
| 6,416,034 B1 | 7/2002 | Sich | |
| 6,422,531 B1 | 7/2002 | Sich | |
| 6,457,782 B1 | 10/2002 | Truglio et al. | |
| 6,472,769 B1 | 10/2002 | Long, Jr. et al. | |
| 6,484,085 B2 | 11/2002 | Marra et al. | |
| 6,508,519 B1 | 1/2003 | Tate | |
| 6,520,599 B2 | 2/2003 | Wood et al. | |
| 6,626,506 B2 | 9/2003 | Kettle, Jr. | |
| 6,676,229 B1 | 1/2004 | Marra et al. | |
| 6,839,664 B1 | 1/2005 | Kull | |
| 6,964,456 B2 | 11/2005 | Root | |
| 6,964,457 B2 | 11/2005 | Kettle, Jr. | |
| 6,979,061 B1 | 12/2005 | Lumbis et al. | |
| 7,144,090 B2 | 12/2006 | Kull et al. | |
| 7,240,970 B2 | 7/2007 | Reynolds et al. | |
| 7,357,463 B2 | 4/2008 | Barberis et al. | |
| 8,049,608 B2 | 11/2011 | Gaughan | |
| 8,226,174 B2 | 7/2012 | Wright | |
| 9,421,960 B2 | 8/2016 | Grasso et al. | |
| 9,481,348 B2 | 11/2016 | Wolf | |
| 9,481,350 B2 | 11/2016 | White et al. | |
| 2005/0099061 A1 | 5/2005 | Hollandsworth et al. | |
| 2009/0229932 A1 | 9/2009 | Reynolds et al. | |
| 2011/0126732 A1 | 6/2011 | Lumbis et al. | |
| 2014/0049037 A1 | 2/2014 | White et al. | |
| 2016/0068148 A1 * | 3/2016 | Connell | B60T 13/665 303/30 |
| 2016/0082939 A1 | 3/2016 | Cole | |
| 2016/0096517 A1 | 4/2016 | Burgess et al. | |
| 2019/0144017 A1 * | 5/2019 | Skweres | B60T 17/228 303/15 |
| 2019/0144018 A1 * | 5/2019 | Plechey | B60T 13/665 303/15 |

FOREIGN PATENT DOCUMENTS

| | | |
|---|---|---|
| AU | 1995034436 | 12/1996 |
| AU | 199744431 B2 | 1/1998 |
| AU | 199737600 B2 | 3/1998 |
| AU | 715160 B2 | 5/1998 |
| AU | 199852725 B2 | 6/1998 |
| AU | 199852063 B2 | 7/1998 |
| AU | 199868072 | 1/1999 |
| AU | 199864810 B2 | 4/1999 |
| AU | 199868064 | 5/1999 |
| AU | 199932941 B2 | 8/1999 |
| AU | 199873974 A1 | 9/1999 |
| AU | 199887118 A1 | 9/1999 |
| AU | 199887911 B2 | 10/1999 |
| AU | 199961796 B2 | 11/1999 |
| AU | 199947586 A1 | 3/2000 |
| AU | 199958760 B2 | 4/2000 |
| AU | 199959547 A1 | 6/2000 |
| AU | 200014942 A1 | 8/2000 |
| AU | 200072507 A1 | 7/2001 |
| AU | 200121249 A1 | 9/2001 |
| AU | 200131331 A1 | 12/2001 |
| AU | 2001288909 B2 | 3/2002 |
| AU | 200197331 A1 | 8/2002 |
| AU | 200224622 A1 | 10/2002 |
| AU | 200234300 A1 | 11/2002 |
| AU | 2002301162 A1 | 6/2003 |
| AU | 2003293127 B2 | 7/2004 |
| AU | 2004200464 A1 | 10/2004 |
| AU | 2004229055 A1 | 5/2005 |
| AU | 2005265120 B2 | 1/2006 |
| AU | 2005248933 B2 | 7/2006 |
| AU | 2006246995 A1 | 11/2006 |
| AU | 2006213940 A1 | 3/2007 |
| AU | 2007214435 A1 | 9/2007 |
| AU | 2008350910 A1 | 8/2009 |
| AU | 2008243171 A1 | 10/2009 |
| AU | 2009202435 B2 | 1/2010 |
| AU | 2010249957 A1 | 11/2010 |
| AU | 2011202517 B2 | 6/2011 |
| AU | 2011244889 A1 | 11/2011 |
| AU | 2013233898 B2 | 9/2013 |
| AU | 2013267542 A1 | 12/2013 |
| AU | 2013213699 A1 | 2/2014 |
| AU | 2013318608 B2 | 3/2014 |
| AU | 2017203507 A1 | 6/2017 |
| EP | 0982209 A1 | 1/2000 |
| EP | 1606154 A1 | 12/2005 |
| NZ | 189408 A | 4/1983 |
| NZ | 216538 A | 9/1987 |
| NZ | 217708 A | 4/1998 |
| NZ | 702290 A | 2/2017 |
| WO | 0222421 A1 | 3/2002 |
| WO | 2004054839 A2 | 7/2004 |
| WO | 2004080775 A1 | 9/2004 |
| WO | 2006122374 A1 | 11/2006 |
| WO | 2010135103 A1 | 11/2010 |
| WO | 2013181189 A1 | 12/2013 |

* cited by examiner

ELECTRONICALLY CONTROLLED BRAKE OVERLAY SYSTEM FOR DISTRIBUTOR VALVE

CROSS-REFERENCE TO RELATED APPLICATION

This application claims priority to U.S. Provisional Application Ser. No. 62/587,057, filed Nov. 16, 2017, which is hereby incorporated by reference in its entirety.

BACKGROUND OF THE INVENTION

Field of the Invention

The present invention relates to a brake apparatus for railway vehicles and, more particularly, to an ECP overlay system for a Russian distributor valve.

Description of Related Art

Railroad freight cars have a brake pipe that runs through each car and is coupled therebetween so as to extend continuously the length of the train. The brake pipe is charged with compressed air typically at the head end by a compressor on the locomotive. The compressed air not only provides the pneumatic brake force at the respective cars, but also serves as a communication link in which the car's brakes are controlled from the locomotive by increasing and decreasing the brake pipe pressure. Brake equipment for railroad freight cars utilizes control valves, also known as distributor valves, to control the operation of the brake cylinders and brakes for the freight cars.

Russian distributor valve systems operate similarly to American Association of Railroads (AAR) pneumatic air brake valves (such as the WABCO ABDX control valve), with a pipe bracket portion, main-line portion, a main portion, a reservoir, and a brake cylinder.

Brake equipment may include Electronically Controlled Pneumatic (ECP) systems to allow for the electronic control of the brakes rather than pneumatic control. ECP braking systems offer many advantages over pneumatic-only control, including superior braking and safety capabilities. ECP brake equipment on each rail vehicle may include a stand-alone All Electric Manifold (AEM), which contains pressure transducers, various pneumatic and electro-pneumatic valves, etc. This equipment is used to monitor the pressures in the brake pipe, the brake cylinder(s), and specific reservoirs, and to convert the electrical brake commands into a form usable by a microprocessor. Operating according to its programming code and to the dictation of the brake commands and other electrical signals it has received, the microprocessor controls the electro-pneumatic valves.

SUMMARY OF THE INVENTION

In one aspect, an ECP overlay system for a Russian distributor valve, the system comprising a manifold body comprising a pipe bracket face configured to engage a face of a pipe bracket of a railway brake system, a valve face configured to engage a mounting face of a main portion of a Russian distributor valve of a railway brake system, and an electric manifold face, an electric manifold assembly engaged with the electric manifold face of the manifold body, the electric manifold assembly having a pneumatic mode where the electric manifold assembly is configured to allow pneumatic-only control of a brake cylinder of railway brake system and an ECP mode where the electric manifold assembly is configured to allow electronic control of a brake cylinder of a railway brake system.

The manifold body may further include a plurality of ports defined by the pipe bracket face, a plurality of ports defined by the valve face, and a plurality of ports defined by the electric manifold face, the plurality of ports of the pipe bracket face are in fluid communication with the plurality of ports of the valve face via a plurality of passages extending through the manifold body, the plurality of ports of the electric manifold face are in fluid communication with the plurality of passages.

The plurality of ports of the pipe bracket face and the plurality of ports of the valve face may each include a reservoir pressure port, a brake pipe pressure port, a brake cylinder pressure port, a valve chamber pressure port, a working chamber pressure port, and an additional discharge channel pressure port, where the reservoir pressure ports of the pipe bracket face and the valve face are in fluid communication via a reservoir pressure passage, the brake pipe pressure ports of the pipe bracket face and the valve face are in fluid communication via a brake pipe pressure passage, the brake cylinder pressure ports of the pipe bracket face and the valve face are in fluid communication via a brake cylinder pressure passage, the valve chamber pressure ports of the pipe bracket face and the valve face are in fluid communication via a valve chamber pressure passage, the working chamber pressure ports of the pipe bracket face and the valve face are in fluid communication via a working chamber pressure passage, and the additional discharge channel pressure ports of the pipe bracket face and the valve face are in fluid communication via a discharge channel passage.

A plurality of ports of the electric manifold face may include a reservoir pressure port, a brake pipe pressure port, and a brake cylinder pressure port, the reservoir pressure port of the electric manifold face is in fluid communication with the reservoir pressure passage, the brake pipe pressure port of the electric manifold face is in fluid communication with the brake pipe pressure passage, and the brake cylinder pressure port of the electric manifold face is in fluid communication with the brake cylinder pressure passage.

The electric manifold assembly may include a cut-out valve, a fill valve, and a brake cylinder exhaust valve, the cut-out valve, the fill valve, and the brake cylinder exhaust valve each having an open position and closed position, and wherein, when the electric manifold assembly is in the ECP mode with the fill valve in the open position and the cut-out valve and the brake cylinder exhaust valve each in the closed position, the fill valve is configured to place a reservoir pressure passage in fluid communication with a brake cylinder pressure passage.

The fill valve may be configured to place a reservoir pressure passage in fluid communication with a brake cylinder pressure passage via a brake cylinder fill choke.

When the electric manifold assembly is in the ECP mode with the brake cylinder exhaust valve in the open position and the fill valve in the closed position, the brake cylinder exhaust valve may be configured to place a brake cylinder pressure passage in fluid communication with atmospheric pressure.

The brake cylinder exhaust valve may be configured to place a brake cylinder pressure passage in fluid communication with atmospheric pressure via a brake cylinder exhaust choke.

The cut-out valve, the fill valve, and the brake cylinder exhaust valve may be electronically-controlled via a cut-out solenoid, a fill solenoid, and a brake cylinder exhaust solenoid, respectively.

The cut-out valve, the fill valve, and the brake cylinder exhaust valve may each include a diaphragm check valve, with the cut-out valve biased to the open position, the fill valve biased to the closed position, the brake cylinder exhaust valve biased to the open position. The cut-out solenoid, the fill solenoid, and the brake cylinder exhaust solenoid each configured to supply pneumatic pressure to the respective cut-out valve, the fill valve, and the brake cylinder exhaust valve to maintain the cut-out valve, the fill valve, and the brake cylinder exhaust valve in the closed position.

When the electric manifold assembly is in the pneumatic mode, the cut-out valve is in the open position to place a brake cylinder passage in fluid communication with a brake cylinder port of the valve face of the manifold body, the fill valve is in the closed position, and the brake cylinder exhaust valve is in the closed position.

The electric manifold assembly may further include a reservoir pressure transducer, a brake pipe pressure transducer, and a brake cylinder pressure transducer.

The manifold body may be configured to be positioned between a pipe bracket and a main portion of a Russian distributor valve.

The electric manifold assembly may include a cut-out valve, a fill valve, and a brake cylinder exhaust valve, with the cut-out valve, the fill valve, and the brake cylinder exhaust valve each having an open position and closed position, and where, when the electric manifold assembly is in the ECP mode with the fill valve in the open position and the cut-out valve and the brake cylinder exhaust valve each in the closed position, the fill valve is configured to place the reservoir pressure passage in fluid communication with the brake cylinder pressure passage.

The fill valve may be configured to place the reservoir pressure passage in fluid communication with the brake cylinder pressure passage via a brake cylinder fill choke.

When the electric manifold assembly is in the ECP mode with the brake cylinder exhaust valve in the open position and the fill valve in the closed position, the brake cylinder exhaust valve may be configured to place the brake cylinder pressure passage in fluid communication with atmospheric pressure.

The brake cylinder exhaust valve may be configured to place the brake cylinder pressure passage in fluid communication with atmospheric pressure via a brake cylinder exhaust choke.

The cut-out valve, the fill valve, and the brake cylinder exhaust valve may be electronically-controlled via a cut-out solenoid, a fill solenoid, and a brake cylinder exhaust solenoid, respectively.

The cut-out valve, the fill valve, and the brake cylinder exhaust valve may each include a diaphragm check valve, with the cut-out valve biased to the open position, the fill valve biased to the closed position, the brake cylinder exhaust valve biased to the open position. The cut-out solenoid, the fill solenoid, and the brake cylinder exhaust solenoid each in fluid communication with the reservoir pressure passage and configured to supply air from the reservoir pressure passage to the respective cut-out valve, the fill valve, and the brake cylinder exhaust valve to maintain the cut-out valve, the fill valve, and the brake cylinder exhaust valve in the closed position.

When the electric manifold assembly is in the pneumatic mode, the cut-out valve is in the open position to place the brake cylinder pressure passage in fluid communication with a main portion of a Russian distributor valve, the fill valve is in the closed position, and the brake cylinder exhaust valve is in the closed position.

Further details and advantages of the various embodiments of the invention detailed herein will become clear upon reviewing the following detailed description of the preferred embodiments in conjunction with the accompanying drawing figures.

DETAILED DESCRIPTION

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
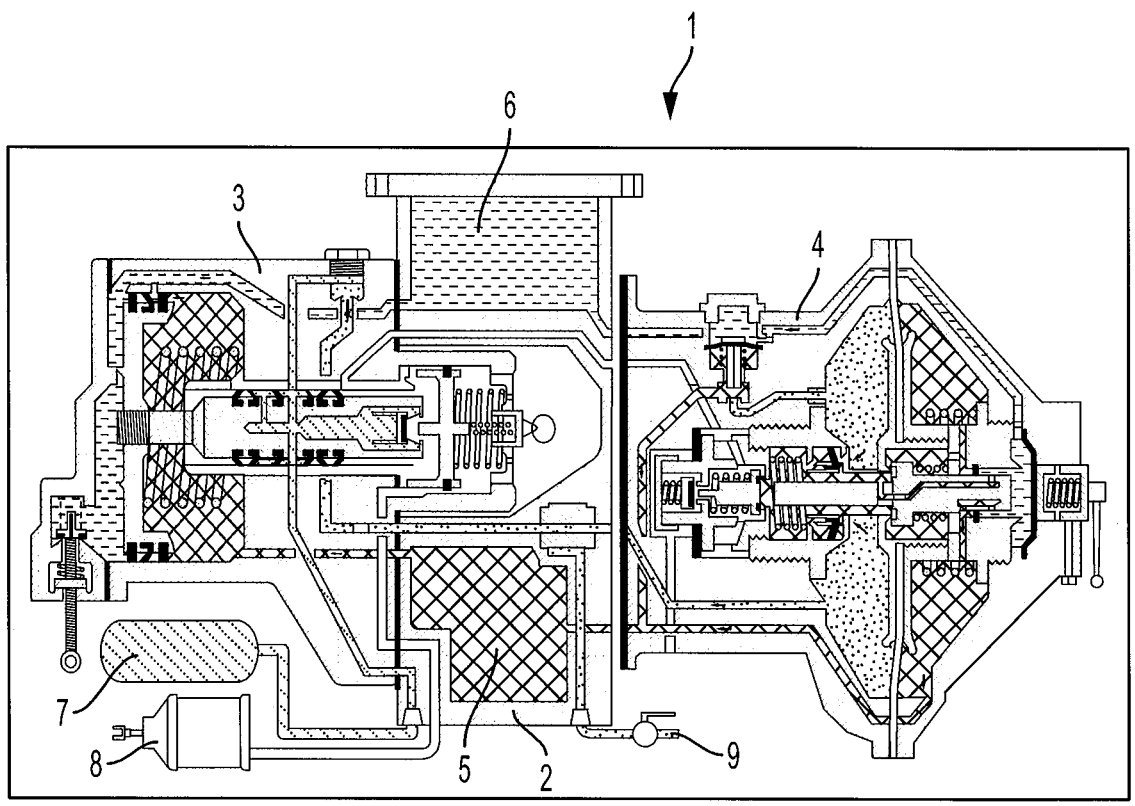
FIG. 1 is a cross-sectional view of a Russian distributor valve.
Figure 2:
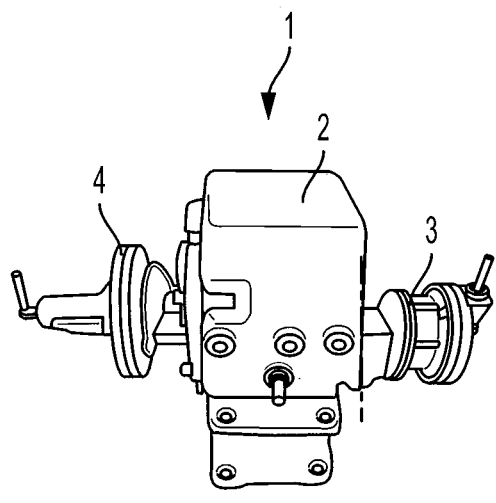
FIG. 2 is a perspective view of a Russian distributor valve according to one configuration.
Figure 3:
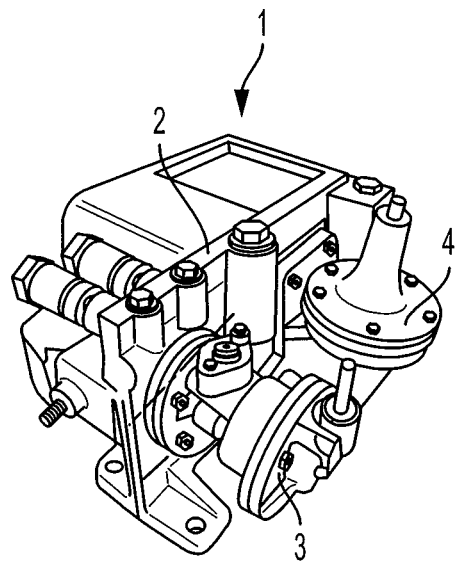
FIG. 3 is a perspective view of a Russian distributor valve according to a further configuration.
Figure 4:
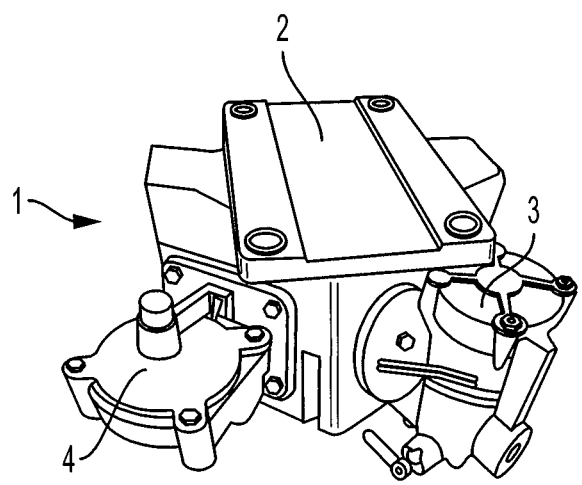
FIG. 4 is a perspective view of a Russian distributor valve according to another configuration.

Referring to FIGS. 1-6, a Russian distributor valve 1 includes a pipe bracket 2 having various pipes attached thereto for establishing a pneumatic connection between the various components of the Russian Distributor valve 1. A main portion 3 and main-line portion 4 are secured to the pipe bracket 2. As shown in FIGS. 2-4, the pipe bracket 2, main portion 3, and main-line portion 4 of the Russian Distributor valve 1 may have various configurations and orientations. The pipe bracket 2 contains an internal valve chamber 5 and an internal working chamber 6 and is in fluid communication with a reservoir 7, a brake cylinder 8, and a brake pipe 9. The flow of the pressurized air between various locations within the Russian Distributor valve 1 is controlled by the main portion 3 and the main-line portion 4 to perform various brake valve functions, including application and release of the brake cylinder 8.

Referring to FIGS. 7-11, an ECP overlay system 10 for a Russian distributor valve 1 is shown. Although specific configurations of the Russian distributor valve 1 are shown in FIGS. 1-11, the ECP overlay system 10 may be utilized in connection with various configurations of Russian distributor valves. The ECP overlay system 10 includes a manifold body 12 and an electric manifold assembly 14 as discussed in more detail below.

Referring to FIGS. 1-11, the manifold body 12 is configured to be positioned between the pipe bracket 2 and the main portion 3 of the Russian distributor valve 1. The manifold body 12 includes a pipe bracket face 16 configured to engage a main portion mounting face 18 of the pipe bracket 2 of the Russian distributor valve 1, a valve face 20 configured to engage a mounting face 22 of the main portion 3 of a Russian distributor valve 1 of a railway brake system, and an electric manifold face 24 configured to engage the electric manifold assembly 14. The pipe bracket face 16 defines a reservoir pressure port 30, a brake pipe pressure port 32, a brake cylinder pressure port 34, a valve chamber pressure port 36, a working chamber pressure port 38, and an additional discharge channel pressure port 40. The valve face 20 also defines a reservoir pressure port 42, a brake pipe pressure port 44, a brake cylinder pressure port 46, a valve chamber pressure port 48, a working chamber pressure port 50, and an additional discharge channel pressure port 52. The reservoir pressure ports 30, 42 of the pipe bracket face 16 and the valve face 20 are in fluid communication via a reservoir pressure passage 54. The brake pipe pressure ports 32, 44 of the pipe bracket face 16 and the valve face 20 are in fluid communication via a brake pipe pressure passage 56. The brake cylinder pressure ports 34, 46 of the pipe bracket face 16 and the valve face 20 are in fluid communication via a brake cylinder pressure passages 57, 58. The valve chamber pressure ports 36, 48 of the pipe bracket face 16 and the valve face 20 are in fluid communication via a valve chamber pressure passage 60. The working chamber pressure ports 38, 50 of the pipe bracket face 16 and the valve face 20 are in fluid communication via a working chamber pressure passage 62. The additional discharge channel pressure ports 40, 52 of the pipe bracket face 16 and the valve face 20 are in fluid communication via a discharge channel passage 64.

Referring to FIGS. 7-11, the electric manifold face 24 also includes a reservoir pressure port 70, a brake pipe pressure port 72, and a brake cylinder pressure port 74. The reservoir pressure port 70 of the electric manifold face 24 is in fluid communication with the reservoir pressure passage 54, the brake pipe pressure port 72 of the electric manifold face 24 is in fluid communication with the brake pipe pressure passage 56, and the brake cylinder pressure port 74 of the electric manifold face 24 is in fluid communication with the brake cylinder pressure passage 58. The manifold body 12 may include a plurality of mounting openings (not shown) configured to receive mounting studs (not shown) from the main portion mounting face 18 of the pipe bracket 2 for securing the manifold body 12 and the main portion 3 of the Russian distributor valve 1 to the pipe bracket 2. The mounting studs may extend through the manifold body 12 and further through a flange of the main portion 3 of the Russian distributor valve 1 for securing the manifold body 12 and the main portion 3 to the pipe bracket 2. The mounting studs of the pipe bracket 2 may be modified or replaced with longer studs to accommodate the manifold body 12.

Figure 5:
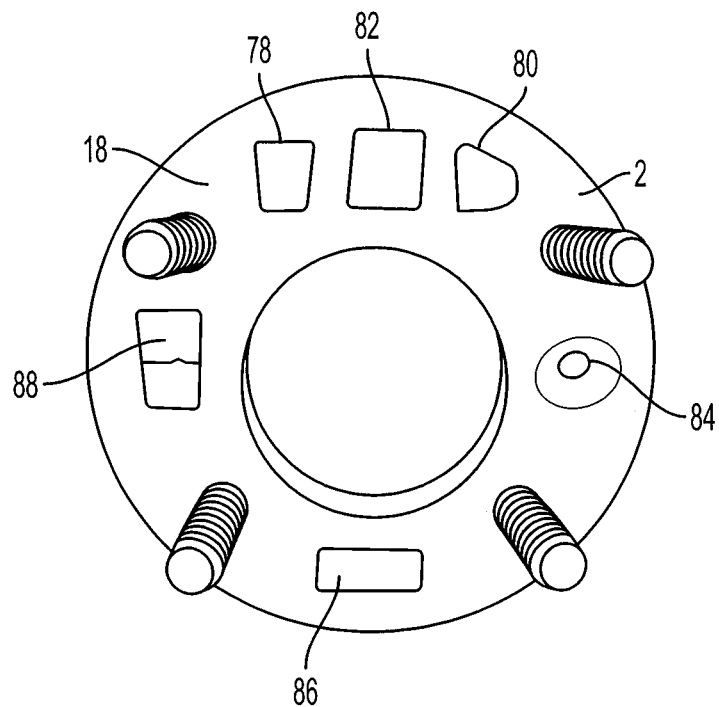
FIG. 5 a front view of a main portion mounting face of a pipe bracket of the braking system of FIG. 1.
Figure 6:
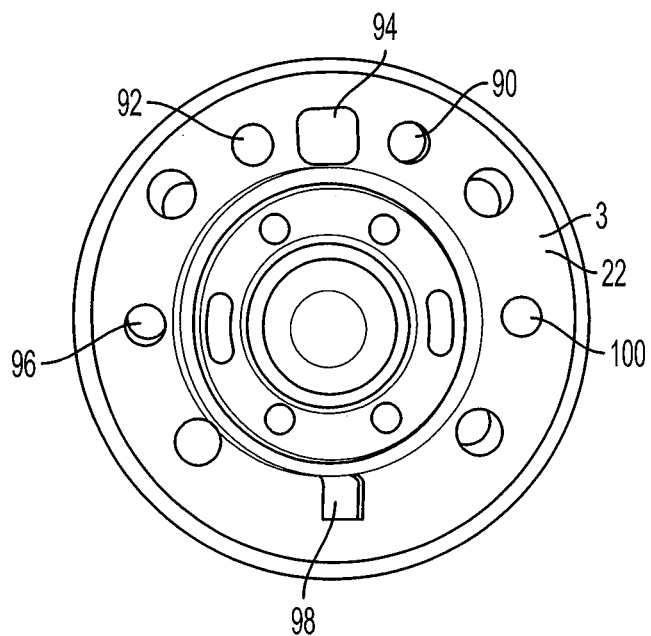
FIG. 6 is a front view of a mounting face of a main portion of the distributor valve of FIG. 1.

Referring to FIGS. 5 and 6, the main portion mounting face 18 of the pipe bracket 2 of the Russian distributor valve 1 includes a reservoir pressure port 78, a brake pipe pressure port 80, a brake cylinder pressure port 82, a valve chamber pressure port 84, a working chamber pressure port 86, and an additional discharge channel pressure port 88 that are configured to be aligned with the corresponding ports 30, 32, 34, 36, 38, 40 of the pipe bracket face 16 of the manifold body 12 discussed above. The mounting face 22 of the main portion 3 of the Russian distributor valve 1 also includes a reservoir pressure port 90, a brake pipe pressure port 92, a brake cylinder pressure port 94, a valve chamber pressure port 96, a working chamber pressure port 98, and an additional discharge channel pressure port 100 that are that are configured to be aligned with the corresponding ports 42, 44, 46, 48, 50, 52 of the valve face 20 of the manifold body 12 discussed above. Accordingly, the manifold body 12 allows for the fluid communication between the pipe bracket 2 and the main portion 3 of the Russian distributor valve 1 while providing access to the various pressures of the system via the electric manifold face 24 for ECP functionality.

Referring to FIGS. 7-11, the electric manifold assembly 14 is engaged with the electric manifold face 24 of the manifold body 12. The electric manifold assembly 14 may include a coin plate (not shown) secured to the manifold body 12. The electric manifold assembly 14 has a pneumatic mode (ECP cut-out) where the electric manifold assembly 14 is configured to allow pneumatic-only control of the brake cylinder 8 of railway brake system and an ECP mode (ECP cut-in) where the electric manifold assembly 14 is configured to allow electronic control of the brake cylinder 8 of a railway brake system. When the electric manifold assembly 14 is in the pneumatic mode, the electric manifold assembly 14 allows the freight brake control valve portion to have control of the railway brake system. When the electric manifold assembly 14 is in ECP mode, the electric manifold assembly 14 allows electronic control to either fill and/or exhaust brake cylinder 8 of a railway brake system.

Figure 7:
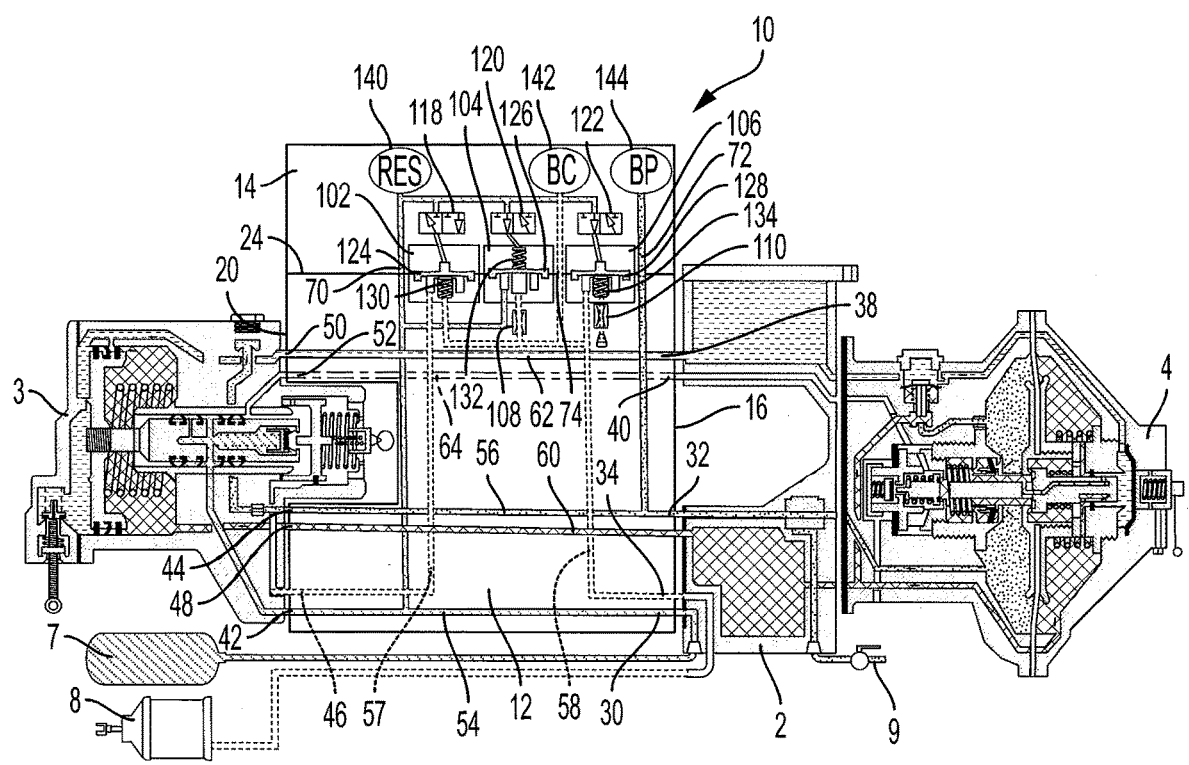
FIG. 7 is a schematic view of an ECP overlay system according to one aspect of the present invention, showing the system in a pneumatic mode (ECP in cut-out position) with a distributor valve in a release position.
Figure 8:
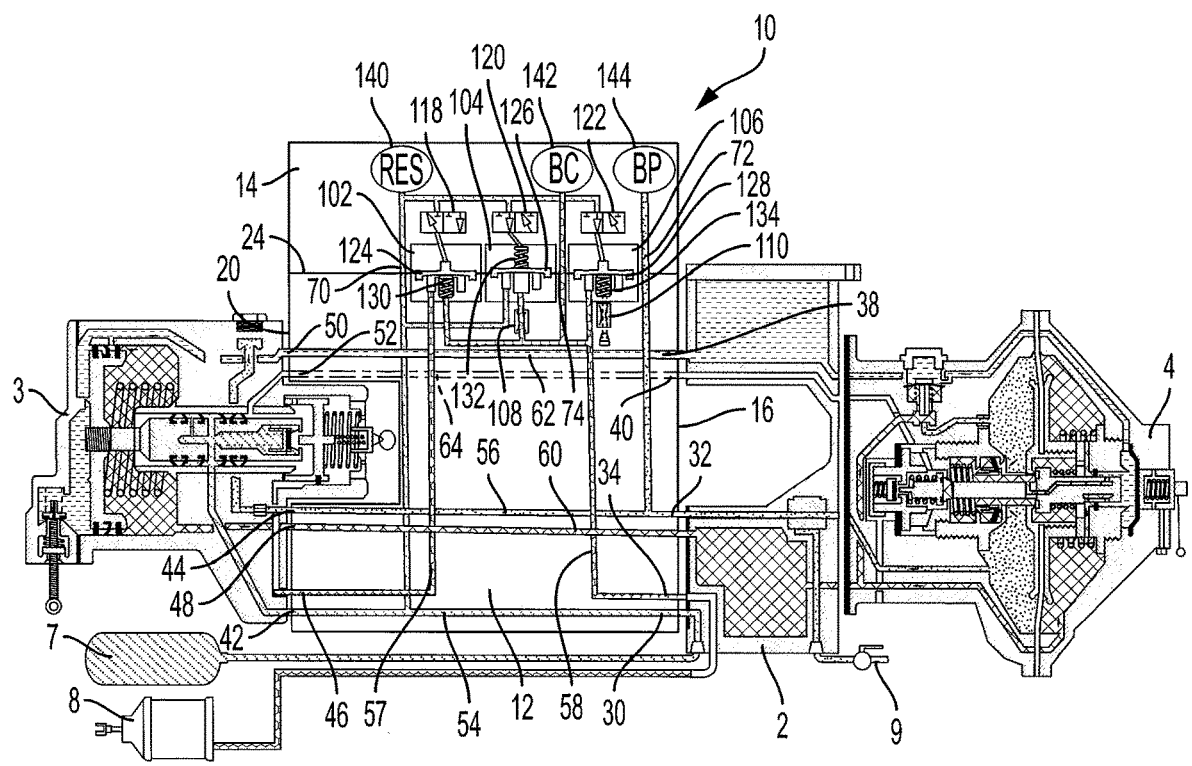
FIG. 8 is a schematic view of the ECP overlay system of FIG. 7 showing the system in a pneumatic mode (ECP in cut-out position) with a distributor valve in an applied position.
Figure 10:
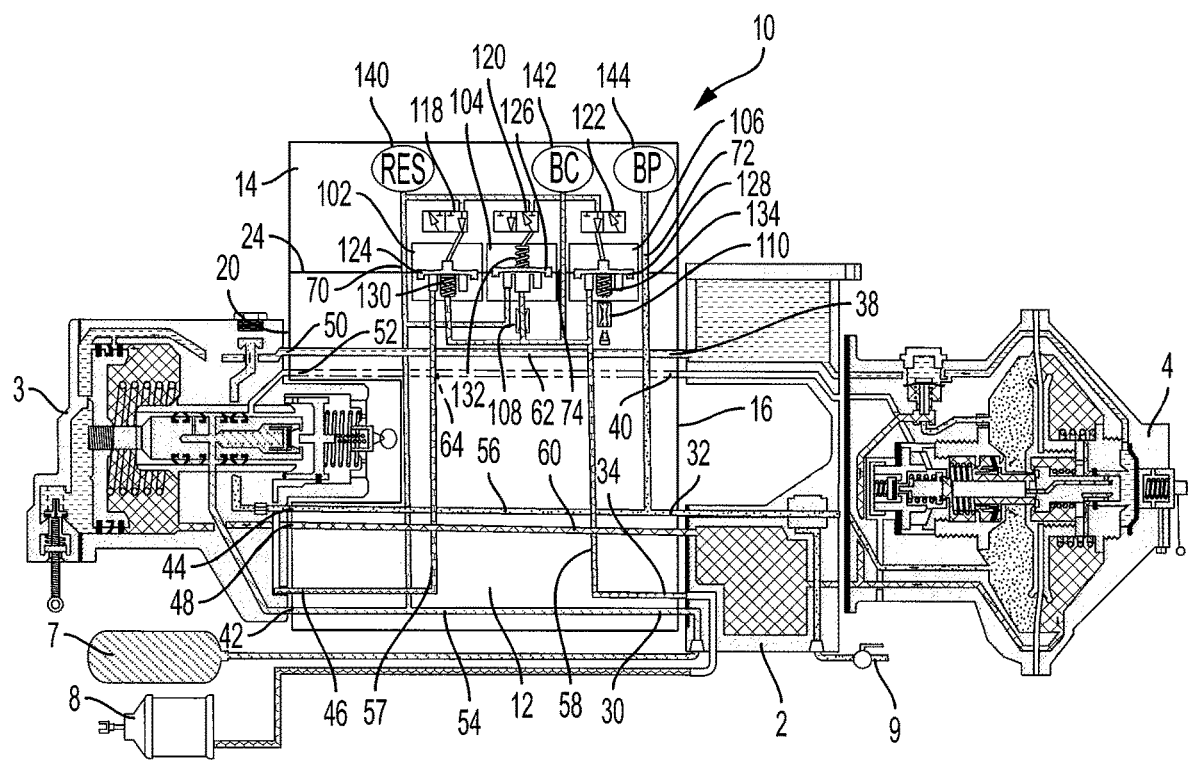
FIG. 10 is a schematic view of the ECP overlay system of FIG. 7, showing the system in an ECP cut-in position with the brakes in an applied position.
Figure 11:
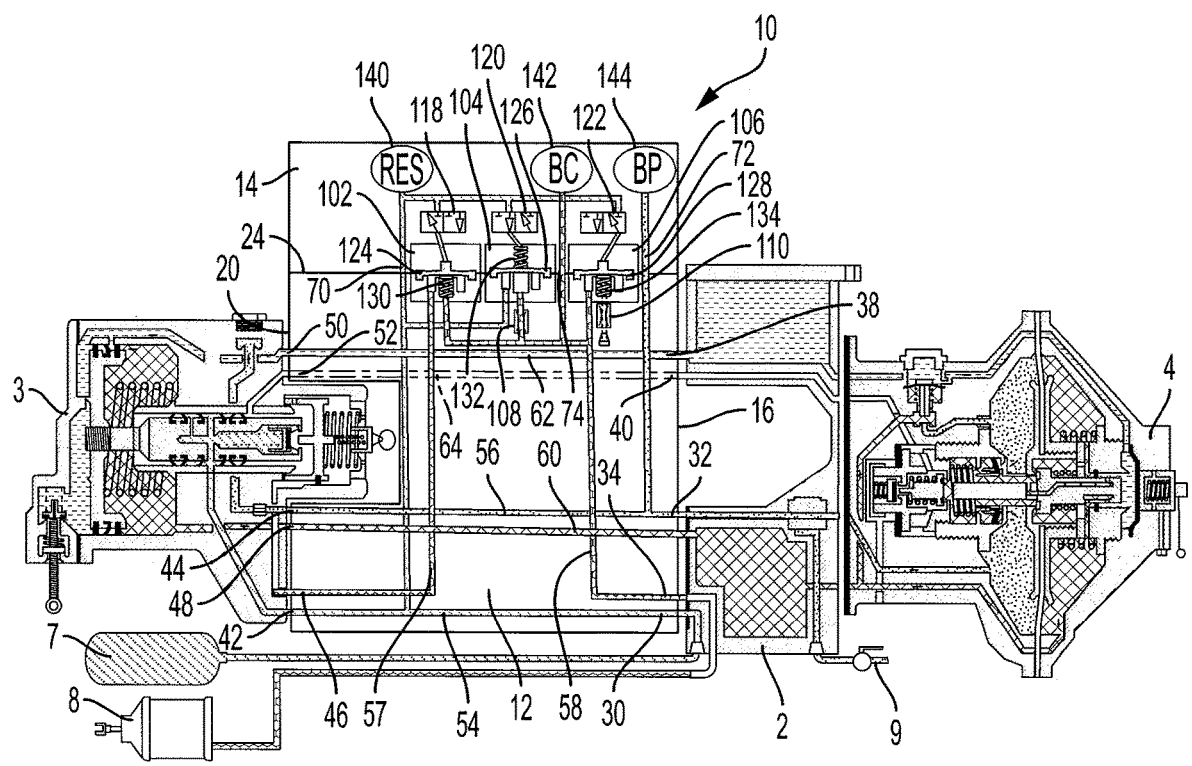
FIG. 11 is a schematic view of the ECP overlay system of FIG. 7, showing the system in an ECP cut-in position with the brakes being released position.

Referring again to FIGS. 7-11, the electric manifold assembly 14 includes a cut-out valve 102, a fill valve 104, and a brake cylinder exhaust valve 106. The cut-out valve 102, the fill valve 104, and the brake cylinder exhaust valve 106 each have an open position and closed position. When the electric manifold assembly 14 is in the ECP mode (ECP cut-in and in "brake application mode) with the fill valve 104 in the open position and the cut-out valve 102 and the brake cylinder exhaust valve 106 each in the closed position, as shown in FIG. 10, the fill valve 104 is configured to place the reservoir passage 54 in fluid communication with the brake cylinder pressure passage 58. As discussed in more detail below, the ECP overlay system 10 shown in FIG. 10 is in ECP mode during a brake application. The fill valve 104 is configured to place the reservoir passage 54 in fluid communication with the brake cylinder pressure 58 passage via a brake cylinder fill choke 108. The cut-out valve 102 is configured to isolate brake cylinder pressure passage 57 from the brake cylinder passage 58. When the electric manifold assembly 14 is in the ECP mode (ECP cut-in and in "brake release mode") with the brake cylinder exhaust valve 106 in the open position and the fill valve 104 in the closed position, as shown in FIG. 11, the brake cylinder exhaust valve 106 is configured to place the brake cylinder pressure passage 58 in fluid communication with atmospheric pressure. In particular, the brake cylinder exhaust valve 106 is configured to place the brake cylinder pressure passage 58 in fluid communication with atmospheric pressure via a brake cylinder exhaust choke 110. The cut-out valve 102 is in the open position thus allowing fluid communication with the brake cylinder pressure passages 57, 58. When the electric manifold assembly 14 is in the pneumatic mode (ECP cut-out), as shown in FIGS. 7 and 8, the cut-out valve 102 is in the open position to place both brake cylinder passages 57, 58 and brake cylinder 8 in fluid communication with the main portion 3 of the Russian distributor valve 1 via the brake cylinder port 46 of the valve face 20 of the manifold body 12, the fill valve 104 is in the closed position, and the brake cylinder exhaust valve 106 is in the closed position. The cut-out valve 102 is configured to place the brake cylinder passages 57, 58 in fluid communication with the main portion 3 of the Russian distributor valve 1 thereby allowing the main portion 3 to be pneumatically responsible for applying and releasing the brake cylinder 8.

The cut-out valve 102, the fill valve 104, and the brake cylinder exhaust valve 106 are electronically-controlled via a cut-out solenoid 118, a fill solenoid 120, and a brake cylinder exhaust solenoid 122, respectively. The cut-out valve 102, the fill valve 104, and the brake cylinder exhaust valve 106 are each diaphragm check valves having a diaphragm 124, 126, 128, although other suitable valve arrangements may be utilized. The cut-out valve 102 is biased to the open position, the fill valve 104 is biased to the closed position, and the brake cylinder exhaust valve 106 is biased to the open position. The cut-out valve 102, the fill valve 104, and the brake cylinder exhaust valve 106 may be biased to their respective position via respective springs 130, 132, 134, although other suitable arrangements may be utilized. The cut-out solenoid 118, the fill solenoid 120, and the brake cylinder exhaust solenoid 122 are each configured to supply pneumatic pressure to the respective cut-out valve 102, the fill valve 104, and the brake cylinder exhaust valve 106 to maintain the cut-out valve 102, the fill valve 104, and the brake cylinder exhaust valve 106 in the closed position. As shown in FIGS. 7-11, the pneumatic pressure may be pressure from the reservoir passage 54 supplied via the solenoids 118, 120, 122 to the respective diaphragms 124, 126, 128 of the valves 102, 104, 106. Opening and closing of the solenoids 118, 120, 122 controls whether the reservoir passage 54 pressure acts on the diaphragms 124, 126, 128 of the valves 102, 104, 106 thereby controlling whether the valves 102, 104, 106 are in the open or closed position.

The cut-out valve 102 is in fluid communication with the brake cylinder passage 58 via brake cylinder passage 57 and is configured to place the main portion 3 of the Russian distributor valve 1 in fluid communication with the brake cylinder passage 58 when the cut-out valve 102 is in the open position (cut-out solenoid 118 de-energized). The main portion 3 of the Russian distributor valve 1 is isolated from the brake cylinder port 82 of the pipe bracket 2 and the brake cylinder 8 when the cut-out valve 102 is in the closed position (cut-out solenoid 118 is energized). The fill valve 104 is in fluid communication with the reservoir passage 54 and the brake cylinder passage 58 with the reservoir passage 54 being in fluid communication with the brake cylinder passage 58 when the fill valve 104 is in the open position (fill solenoid 120 energized). The reservoir passage 54 is isolated from the brake cylinder passage 58 when the fill valve 104 is in the closed position (fill solenoid 120 de-energized). The brake cylinder exhaust valve 106 is in fluid communication with the brake cylinder passage 58 and atmospheric pressure via the brake cylinder exhaust choke 110. The brake cylinder pressure passage 58 is in fluid communication with atmospheric pressure with the brake cylinder exhaust valve 106 in the open position (brake cylinder exhaust solenoid 122 energized). The brake cylinder pressure passage 58 is isolated from atmospheric pressure when the brake cylinder exhaust valve 106 is in the closed position (brake cylinder exhaust solenoid 122 de-energized).

Referring again to FIGS. 7-11, the electric manifold assembly 14 further includes a reservoir pressure transducer 140, a brake cylinder pressure transducer 142, and a brake pipe pressure transducer 144 to measure the respective pressures of the passages 54, 58, 56.

Pneumatic Mode

Referring to FIGS. 7 and 8, the electric manifold assembly 14 is in pneumatic mode to provide for pneumatic-only control of the Russian distributor valve 1. More specifically, when the electric manifold assembly 14 is electronically cut-out while in pneumatic mode, the Russian distributor valve 1 is allowed to maintain pneumatic control of the freight brake system. While in pneumatic mode, the electric manifold assembly 14 is electronically cut out and the Russian distributor valve 1 provides the feed of reservoir 7 pressure to the brake cylinder 8. The cut-out valve 102 is in the open position (cut-out solenoid 118 de-energized) to allow the brake cylinder passages 57, 58 and brake cylinder 8 to be in fluid communication with the main portion 3 of the Russian distributor valve 1. The fill valve 104 and the brake cylinder exhaust valve 106 are in the closed position (fill solenoid 120 and brake cylinder exhaust solenoid 122 de-energized) and pressurized on their seats by the reservoir passage pressure 54 via the solenoids 120, 122 thereby isolating the reservoir passage 54 from the brake cylinder pressure passage 58 as well as isolating the brake cylinder pressure passage 58 from atmosphere via the brake cylinder exhaust valve 106. Accordingly, the Russian distributor valve 1 is pneumatically responsible for applying and releasing the brake cylinder 8 on the freight vehicle based on manipulations of brake pipe pressure in the train. The Russian distributor valve 1 is shown in a released position in FIG. 7 and an applied position in FIG. 8.

ECP Mode in Release Position

Figure 9:
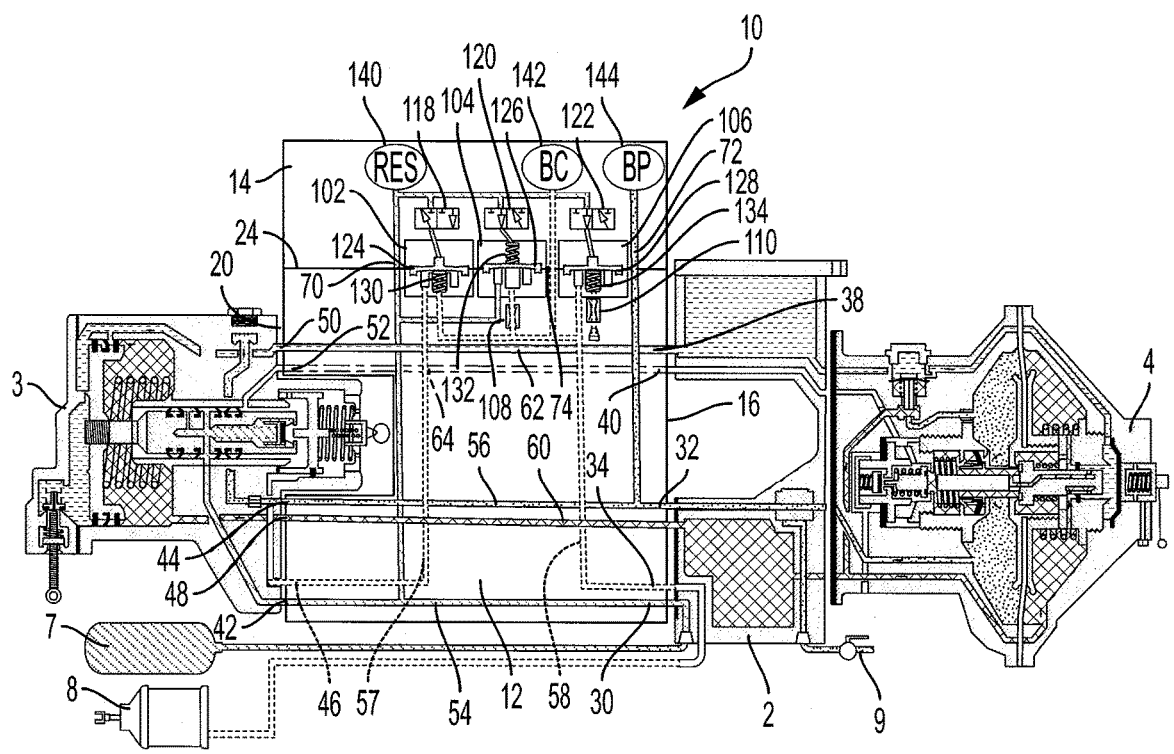
FIG. 9 is a schematic view of the ECP overlay system of FIG. 7, showing the system in an ECP cut-in position with the brakes released.

Referring to FIG. 9, the electric manifold assembly 14 is in ECP mode (electric manifold assembly 14 cut-in) and the Russian distributor valve 1 is in a release position. The electric manifold assembly 14 is placed in ECP mode electronically. The brake pipe 9 of the train and the brake pipe passage 56 are maintained at the system supply charge pressure such that Russian distributor valve 1 never develops a pressure differential required internally to initiate a brake application thereby keeping the Russian distributor valve 1 in the release position. The cut-out valve 102 is in the open position (cut-out solenoid 118 de-energized) to place the brake cylinder passages 57, 58 and brake cylinder 8 in fluid communication with the main portion 3 of the Russian distributor valve 1. In a release position in ECP mode, the fill valve 104 and the brake cylinder exhaust valve 106 are in the closed position (fill solenoid 120 and brake cylinder exhaust solenoid 122 de-energized) and pressurized on their seats by the reservoir passage pressure 54 via the solenoids 120, 122 thereby isolating the reservoir passage 54 from the brake cylinder passage 58 as well as isolating the brake cylinder passage 58 from atmosphere via the brake cylinder exhaust valve 106 within the electric manifold assembly 14.

ECP Mode in Application Position

Referring to FIG. 10, the electric manifold assembly 14 is in ECP mode (electric manifold assembly 14 cut-in) to provide electronic control of reservoir pressure passage 54 during a brake application. The brake pipe 9 of the train and the brake pipe passage 56 are maintained at the system supply charge pressure such that Russian distributor valve 1 never develops a pressure differential required internally to initiate a brake application thereby keeping the Russian distributor valve 1 in the release position. While in ECP mode and when a signal for electronic braking is obtained, the cut-out valve 102 is moved to the closed position (cut-out solenoid 118 energized) and held on its seat by pressure from the reservoir passage 54 via the cut-out solenoid 118. In other words, the cut-out solenoid 118 is electronically energized or actuated to allow the flow of air from the reservoir passage 54 to the top side of the diaphragm 124 of the cut-out valve 102 to move the cut-out valve 102 to the closed position.

The fill valve 104 is moved to the open position by electronically energizing or actuating the fill solenoid 120 to isolate the flow of air from the reservoir passage 54 to the top side of the diaphragm 126 of the fill valve 104 and venting it to atmosphere thereby allowing the pressure from the reservoir passage 54 to overcome the biasing force of the spring 132 of the fill valve 104 to unseat the diaphragm 126. With the fill valve 104 in the open position, pressure from the reservoir passage 54 is directed to the brake cylinder passage 58 via the brake cylinder fill choke 108 to initiate a brake application. The brake cylinder exhaust valve 106 remains in the closed position (brake cylinder exhaust solenoid 122 remains de-energized) and pressurized on its seat by the reservoir passage 54 pressure via the brake cylinder exhaust solenoid 122 thereby isolating the brake cylinder passage 54 from the atmosphere via the brake cylinder exhaust valve 106. Once the target brake cylinder pressure is obtained, the fill solenoid 120 is de-energized, thus allowing the fill valve 104 to close on its seat to terminate the flow of reservoir pressure 54 into the brake cylinder passage 58.

ECP Mode in Brakes Being Released Position

Referring to FIG. 11, while in ECP mode and when the signal to release brake cylinder pressure is obtained by the electric manifold assembly 14, the fill valve 104 is already in its closed position, where reservoir passage 54 is isolated from the brake cylinder passage 58. The cut-out valve 102 is moved to the open position by de-energizing the cut-out solenoid 118 to exhaust reservoir pressure acting on the top side of the diaphragm 124 to atmosphere and the biasing force of the spring 130 unseats the diaphragm 124. The brake cylinder exhaust valve 106 is moved to the open position by energizing the brake cylinder exhaust solenoid 122 thereby allowing brake cylinder pressure to vent to atmosphere via the brake cylinder exhaust choke 110 to release the brake application. When brake cylinder 8 pressure reaches an upper predetermined pressure, such as approximately 11 psi, in brake cylinder passage 58, the brake cylinder exhaust valve 106 is moved back to its closed position by de-energizing the brake cylinder exhaust solenoid 122 until brake cylinder pressure reaches a lower predetermined pressure, such as approximately 5 psi, in brake cylinder passage 58, the brake cylinder exhaust valve 106 is re-opened by energizing solenoid 122 once again until brake cylinder pressure reaches approximately 0 psi in brake cylinder passage 58. At this point, the brake cylinder exhaust valve 106 is moved back to its closed position by de-energizing the brake cylinder exhaust solenoid 122.

While embodiments of ECP overlay system were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. An electronically controlled brake overlay system, the system comprising:
   a manifold body comprising a pipe bracket face configured to engage a face of a pipe bracket of a brake system, a valve face configured to engage a mounting face of a main portion of a distributor valve of the brake system, and an electric manifold face; and
   an electric manifold assembly engaged with the electric manifold face of the manifold body, the electric manifold assembly having a pneumatic mode where the electric manifold assembly is configured to allow pneumatic-only control of a brake cylinder of the brake system and an electronically controlled pneumatic (ECP) mode where the electric manifold assembly is configured to allow electronic control of the brake cylinder of the brake system,
   wherein the electric manifold assembly comprises a cut-out valve, a fill valve, and a brake cylinder exhaust valve, the cut-out valve, the fill valve, and the brake cylinder exhaust valve each having an open position and closed position, and wherein, while the electric manifold assembly is in the ECP mode with the fill valve in the open position and the cut-out valve and the brake cylinder exhaust valve each in the closed position, the fill valve is configured to place a reservoir pressure passage in fluid communication with a brake cylinder pressure passage.

2. The system of claim 1, wherein the manifold body further comprises a plurality of ports defined by the pipe bracket face, a plurality of ports defined by the valve face, and a plurality of ports defined by the electric manifold face, the plurality of ports of the pipe bracket face in fluid communication with the plurality of ports of the valve face via a plurality of passages extending through the manifold body, the plurality of ports of the electric manifold face in fluid communication with the plurality of passages.

3. The system of claim 2, wherein the plurality of ports of the pipe bracket face and the plurality of ports of the valve face each comprise a reservoir pressure port, a brake pipe pressure port, a brake cylinder pressure port, a valve chamber pressure port, a working chamber pressure port, and an additional discharge channel pressure port, the reservoir pressure ports of the pipe bracket face and the valve face in fluid communication via a reservoir pressure passage, the brake pipe pressure ports of the pipe bracket face and the valve face in fluid communication via a brake pipe pressure passage, the brake cylinder pressure ports of the pipe bracket face and the valve face in fluid communication via a brake cylinder pressure passage, the valve chamber pressure ports of the pipe bracket face and the valve face in fluid communication via a valve chamber pressure passage, the working chamber pressure ports of the pipe bracket face and the valve face in fluid communication via a working chamber pressure passage, the additional discharge channel pressure ports of the pipe bracket face and the valve face in fluid communication via a discharge channel passage.

4. The system of claim 3, wherein a plurality of ports of the electric manifold face comprises a reservoir pressure port, a brake pipe pressure port, and a brake cylinder pressure port, the reservoir pressure port of the electric manifold face in fluid communication with the reservoir pressure passage, the brake pipe pressure port of the electric manifold face in fluid communication with the brake pipe pressure passage, and the brake cylinder pressure port of the electric manifold face in fluid communication with the brake cylinder pressure passage.

5. The system of claim 4, wherein the electric manifold assembly comprises a cut-out valve, a fill valve, and a brake cylinder exhaust valve, the cut-out valve, the fill valve, and the brake cylinder exhaust valve each having an open position and closed position, and wherein, when the electric manifold assembly is in the ECP mode with the fill valve in the open position and the cut-out valve and the brake cylinder exhaust valve each in the closed position, the fill valve is configured to place the reservoir pressure passage in fluid communication with the brake cylinder pressure passage.

6. The system of claim 5, wherein the fill valve is configured to place the reservoir pressure passage in fluid communication with the brake cylinder pressure passage via a brake cylinder fill choke.

7. The system of claim 5, wherein, while the electric manifold assembly is in the ECP mode with the brake cylinder exhaust valve in the open position and the fill valve in the closed position, the brake cylinder exhaust valve is configured to place the brake cylinder pressure passage in fluid communication with atmospheric pressure.

8. The system of claim 7, wherein the brake cylinder exhaust valve is configured to place the brake cylinder pressure passage in fluid communication with atmospheric pressure via a brake cylinder exhaust choke.

9. The system of claim 5, wherein the cut-out valve, the fill valve, and the brake cylinder exhaust valve are electronically-controlled via a cut-out solenoid, a fill solenoid, and a brake cylinder exhaust solenoid, respectively.

10. The system of claim 9, wherein the cut-out valve, the fill valve, and the brake cylinder exhaust valve each comprise a diaphragm check valve, the cut-out valve biased to the open position, the fill valve biased to the closed position, the brake cylinder exhaust valve biased to the open position, the cut-out solenoid, the fill solenoid, and the brake cylinder exhaust solenoid each in fluid communication with the reservoir pressure passage and configured to supply air from the reservoir pressure passage to the respective cut-out valve, the fill valve, and the brake cylinder exhaust valve to maintain the cut-out valve, the fill valve, and the brake cylinder exhaust valve in the closed position.

11. The system of claim 5, wherein, while the electric manifold assembly is in the pneumatic mode, the cut-out valve is in the open position to place the brake cylinder pressure passage in fluid communication with a main portion of the distributor valve, the fill valve is in the closed position, and the brake cylinder exhaust valve is in the closed position.

12. The system of claim 1, wherein the fill valve is configured to place a reservoir pressure passage in fluid communication with the brake cylinder pressure passage via a brake cylinder fill choke.

13. The system of claim 1, wherein, while the electric manifold assembly is in the ECP mode with the brake cylinder exhaust valve in the open position and the fill valve in the closed position, the brake cylinder exhaust valve is configured to place the brake cylinder pressure passage in fluid communication with atmospheric pressure.

14. The system of claim 13, wherein the brake cylinder exhaust valve is configured to place the brake cylinder pressure passage in fluid communication with atmospheric pressure via a brake cylinder exhaust choke.

15. The system of claim 5, wherein the cut-out valve, the fill valve, and the brake cylinder exhaust valve are electronically-controlled via a cut-out solenoid, a fill solenoid, and a brake cylinder exhaust solenoid, respectively.

16. The system of claim 15, wherein the cut-out valve, the fill valve, and the brake cylinder exhaust valve each comprise a diaphragm check valve, the cut-out valve biased to the open position, the fill valve biased to the closed position, the brake cylinder exhaust valve biased to the open position, the cut-out solenoid, the fill solenoid, and the brake cylinder exhaust solenoid each configured to supply pneumatic pressure to the respective cut-out valve, the fill valve, and the brake cylinder exhaust valve to maintain the cut-out valve, the fill valve, and the brake cylinder exhaust valve in the closed position.

17. The system of claim 1, wherein, while the electric manifold assembly is in the pneumatic mode, the cut-out valve is in the open position to place a brake cylinder passage in fluid communication with a brake cylinder port of the valve face of the manifold body, the fill valve is in the closed position, and the brake cylinder exhaust valve is in the closed position.

18. The system of claim 1, wherein the electric manifold assembly further comprises a reservoir pressure transducer, a brake pipe pressure transducer, and a brake cylinder pressure transducer.

19. The system of claim 1, wherein the manifold body is configured to be positioned between the pipe bracket and the main portion of the distributor valve.

\* \* \* \* \*